United States Patent
Kohler et al.

(10) Patent No.: US 7,570,730 B2
(45) Date of Patent: Aug. 4, 2009

(54) MULTIPLE FOCUS ACQUISITION

(75) Inventors: Thomas Kohler, Aachen (DE); Claas Bontus, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 356 days.

(21) Appl. No.: 10/598,866

(22) PCT Filed: Mar. 7, 2005

(86) PCT No.: PCT/IB2005/050824

§ 371 (c)(1),
(2), (4) Date: Sep. 14, 2006

(87) PCT Pub. No.: WO2005/091216

PCT Pub. Date: Sep. 29, 2005

(65) Prior Publication Data

US 2008/0095299 A1    Apr. 24, 2008

(30) Foreign Application Priority Data

Mar. 17, 2004  (EP) .................................. 04101102

(51) Int. Cl.
 *A61B 6/03*  (2006.01)
(52) U.S. Cl. ............................... 378/4; 378/9; 378/901; 382/131
(58) Field of Classification Search ............... 378/4, 378/11–15, 901; 382/128–131
See application file for complete search history.

(56) References Cited

U.S. PATENT DOCUMENTS

| | | | | | |
|---|---|---|---|---|---|
| 4,637,040 | A | * | 1/1987 | Sohval et al. | 378/9 |
| 5,265,142 | A | * | 11/1993 | Hsieh | 378/4 |
| 6,411,670 | B1 | * | 6/2002 | Besson | 378/4 |
| 6,504,892 | B1 | | 1/2003 | Ning | |
| 2004/0081279 | A1 | | 4/2004 | Brunnett | |

FOREIGN PATENT DOCUMENTS

| | | |
|---|---|---|
| EP | 0 467 532 A2 | 6/1990 |
| EP | 0 543 626 A1 | 5/1993 |
| EP | 1 211 917 A1 | 6/2002 |
| WO | WO 03 051201 A2 | 6/2003 |

OTHER PUBLICATIONS

Kachelriess et al., 4D Reconstruction for Wide Cone-Angle Medical CT, Oct. 2003, 2003 IEEE Nuclear Science Conference Record, vol. 5, pp. 3248-3254.*

Besson, G.M.; CT Image Reconstruction from Fan-Parallel Projection Data; 1998; Nuclear Science Symposium Conf. Record; 1644-1648.

(Continued)

*Primary Examiner*—Edward J Glick
*Assistant Examiner*—John M Corbett (57) ABSTRACT

Image quality is an important feature for CT scanning, in particular for helical cone-beam CT scanning. By using projection data acquired at two different positions of the focal spot of the radiation beam and rebinning that projection data from a first geometry to a second geometry the two sub-sets of projection data are combined to one rebinned projection data set, thereby improving the radial resolution of the data set. Advantageously, according to an aspect of the present invention, a further rebinning may be performed, from the second geometry back to the first geometry, therefore resulting in a projection data set in the initial geometry with a higher radial resolution.

20 Claims, 5 Drawing Sheets

OTHER PUBLICATIONS

Bontus, C., et al.; A quasiexact reconstruction algorithm for helical CT using a 3-Pi acquisition; 2003; Medical Physics; vol. 30:2493-2502.

Hsieh, J.; Optimization of detector geometry for aliasing artifact reduction in the third-generation CT; 1997; Proc. of the SPIE. Int'l. Soc. for Opt. Eng.; vol. 3032:204-212.

Hsieh, J., et al.; A reconstruction technique for focal spot wobbling; 1992; SPIE Medical Imaging; vol. 1652:175-182.

Katsevich, A.; Analysis of an exact inversion algorithm for spiral cone-beam CT; 2002; Physics in Medicine and Biology; 47:2583-2597.

* cited by examiner

MULTIPLE FOCUS ACQUISITION

The present invention relates to the field of image processing, for example in medical applications. In particular, the present invention relates to a method of processing a projection data set of an object of interest, to a data processing device, to a CT scanner system and to respective computer programs.

The current trend for the development of high-end CT systems can clearly be recognized: The number of detector rows and the cone-angles are increasing, associated with shorter and shorter gantry rotation times. From the perspective of reconstruction, different algorithms have to be assessed concerning their numerical stability, speed and their sensitivity to all kinds of system imperfections. Reconstruction algorithms for helical scanning can coarsely be divided into two groups, approximate and exact ones.

The approximate algorithms are optimized for speed, i.e. short reconstruction times. However, from the business point of view, image quality and the fact that there is an exact algorithm implemented in the CT scanner system can have a significant influence on the sales numbers. The exact algorithms are based on mathematical formulae, which ensure that a continuous mathematical function is reconstructed without error. These formulae are usually derived using knowledge about Radon inversion. Exact methods suffer from the disadvantage of being slow and sensitive to discretization errors.

The situation has changed, however, since very recently Alexander Katsevich published a new exact reconstruction algorithm for helical CT, which is described in A. Katsevich, "Analysis of an exact inversion algorithm for spiral cone-beam CT", Physics in Medicine and Biology, vol 47, pp 2583-2597 (2002).

Numerically efficient filtered back-projection type algorithms for cone-beam CT (for example for a PI or 3-PI acquisition) are based on the work of Katsevich. These methods have in common, that in a first pre-processing step, the derivation of parallel rays has to be computed, followed by a convolution with $1/\sin \gamma$ in cone-beam geometry ($\gamma$ being the angle within the Katsevich plane). More details can be found in the paper by Bontus, Koehler, and Proksa "A quasiexact reconstruction algorithm for helical CT using a 3-Pi acquisition", Medical Physics, vol 30, pp 2493-2502 (2003), which is hereby incorporated by reference All these methods are currently restricted to the so-called low resolution mode, where neither multiple focus acquisition nor a quarter detector shift is used in order to obtain images with a higher resolution than the resolution of the detector.

It is an object of the present invention to provide for an improved final image.

According to an exemplary embodiment of the present invention, the above object may be solved by a method of processing a projection data set of an object of interest, wherein the projection data is acquired by means of a source of electro-magnetic radiation generating a beam and by means of a radiation detector detecting the beam. According to this exemplary embodiment of the present invention, the projection data set is rebinned from a first geometry to a second geometry, resulting in a first rebinned projection data set, wherein a second radial resolution of the first rebinned projection data set in the second geometry is higher than a first radial resolution of the projection data set in the first geometry.

In other words, a resorting of the projection data set is performed, for example by performing an interpolation, resulting in an improved resolution of the rebinned projection data set.

According to another exemplary embodiment of the present invention, the projection data set in the first geometry comprises a first focus data set and a second focus data set, wherein the first focus data set is acquired at a first position relative to the detector of a focal spot of the electro-magnetic radiation emitted from the source and wherein the second focus data set is acquired at a second position of a focal spot relative to the detector of the electro-magnetic radiation emitted from the source.

Therefore, according to this exemplary embodiment of the present invention, two data sets are acquired, wherein the first data set corresponds to a first focal setting of the radiation source and wherein the second data set corresponds to a second focal setting of the radiation source. Advantageously, by acquiring two data sets with different focal settings, and by combining these two data sets in a rebinning step, an increase of radial resolution of the projection data set may be achieved. Advantageously, shifting the position of the focal spot is a fast and easy to perform procedure, which does not require any mechanical action, and may therefore be performed during normal data acquisition.

Another exemplary embodiment of the present invention further comprises the step of rebinning the first rebinned projection data set from the second geometry to a third geometry, resulting in a second rebinned projection data set. The second rebinned projection data set comprises a third focus data set, wherein a third radial resolution of the third focus data set is higher than the first radial resolution of the projection data set and the first geometry.

Advantageously, according to this exemplary embodiment of the present invention, the second rebinning of the projection data set may allow for a rebinning back to the initial geometry. But now a two times rebinned projection data set comprises, according to an aspect of this exemplary embodiment of the present invention, only one focus data set and not two focus data sets (as it did before the two rebinning steps). Advantageously, according to this exemplary embodiment of the present invention, a data set may be generated in the initial geometry which is a data set of one position of the focal spot of the electro-magnetic radiation source but with a higher, for example, doubled radial resolution.

According to another exemplary embodiment of the present invention, the first geometry is one of a fan-beam geometry and a cone-beam geometry and the second geometry is a parallel-beam geometry. Furthermore, the third geometry is one of a fan-beam geometry and a cone-beam geometry.

Advantageously, according to this exemplary embodiment of the present invention, the projection data set is acquired in a cone-beam geometry and then rebinned to a parallel-beam geometry of a higher radial resolution. In a second rebinning step, the projection data set is rebinned back to the cone-beam geometry. Here, the high resolution of the parallel projections is maintained, resulting in a set of cone-beam projections with a higher resolution than the original cone-beam projections.

According to another exemplary embodiment of the present invention, the rebinning of the projection data set from the first geometry to the second geometry is performed by a first angular interpolation and the rebinning of the projection data set from the second geometry to the third geometry is performed by a second angular interpolation, wherein the first angular interpolation and the second angular interpolations are performed in a direction of a view-angle with a constant fan-angle.

Advantageously, this may allow for a fast processing of the projection data set.

Furthermore, according to another exemplary embodiment of the present invention, the reconstruction of the object of interest is performed by a filtered back-projection algorithm. The data are hereby either back-projected directly, using a voxel dependent magnification or another parallel rebinning is applied followed by a simple back-projection without magnification.

Advantageously, according to this exemplary embodiment of the present invention, the filtered back-projection procedure may be an exact algorithm such as an algorithm based on the work of A. Katsevich, "Analysis of an exact inversion algorithm for spiral cone-beam CT", Physics in Medicine and Biology, vol 47, pp 2583-2597 (2002), which is hereby incorporated by reference. This may provide for a fast and exact processing of the projection data set.

According to another exemplary embodiment of the present invention, the source of electro-magnetic radiation is a polychromatic x-ray source, wherein the source moves along a helical path around the object of interest and wherein the beam has one of a fan-beam geometry and a cone-beam geometry.

The application of a polychromatic x-ray source is advantageous, since polychromatic x-rays are easy to generate and provide a good image resolution. It should be noted that, since the geometry of the CT scanner system may be of different designs, such as, for example, cone-beam or fan-beam geometry, a method for an exemplary embodiment of the present invention may be applied to a plurality of different scanner systems and may not be limited to CT scanner systems, but may be applied to PET (positron emission tomography) scanner systems or SPECT (single photon emission computed tomography) scanner systems.

Other exemplary embodiments of the present invention provide for a data processing device for processing a projection data set of an object of interest by rebinning the projection data set from a first geometry to a second geometry, which may result in an improvement of a radial resolution of the projection data set.

According to other exemplary embodiments of the present invention, a CT scanner system is provided, comprising a memory for storing a data set and a data processor for performing a processing of a projection data set of an object of interest according to an exemplary embodiment of a method according to the present invention.

The present invention also relates to a computer program, which may, for example, be executed on a processor, such as an image processor. Such a computer program may be part of, for example, a CT scanner system. The computer program may be preferably loaded into working memories of a data processor. The data processor is thus equipped to carry out exemplary embodiment of the methods of the present invention. The computer program may be written in any suitable programming language, for example, in C++ and may be stored on a computer readable medium, such as a CD-ROM. Also, these computer programs may be available from a network, such as the WorldWideWeb, from which they may be downloaded into image processing units or processors, or any suitable computers.

It may be seen as the gist of an exemplary embodiment of the present invention that a rebinning of a projection data set comprising a plurality of sub-sets of data, wherein each sub-set is acquired at different positions of a focal spot, is performed from a first geometry to a second geometry. By rebinning the projection data set the plurality of sub-sets are combined to one rebinned projection data set, thereby improving the radial resolution of an image reconstructed from the data set. According to an exemplary embodiment of the present invention, the first geometry is a cone-beam geometry and the second geometry is a parallel-beam geometry. Advantageously, according to an aspect of the present invention, a further rebinning may be performed, from the parallel-beam geometry back to the cone-beam geometry, therefore resulting in a projection data set in the initial geometry with a higher radial resolution.

These and other aspects of the present invention will become apparent from and will be elucidated with reference to the embodiments described hereinafter.

Exemplary embodiments of the present invention will be described in the following, with reference to the drawings.

Figure 1:
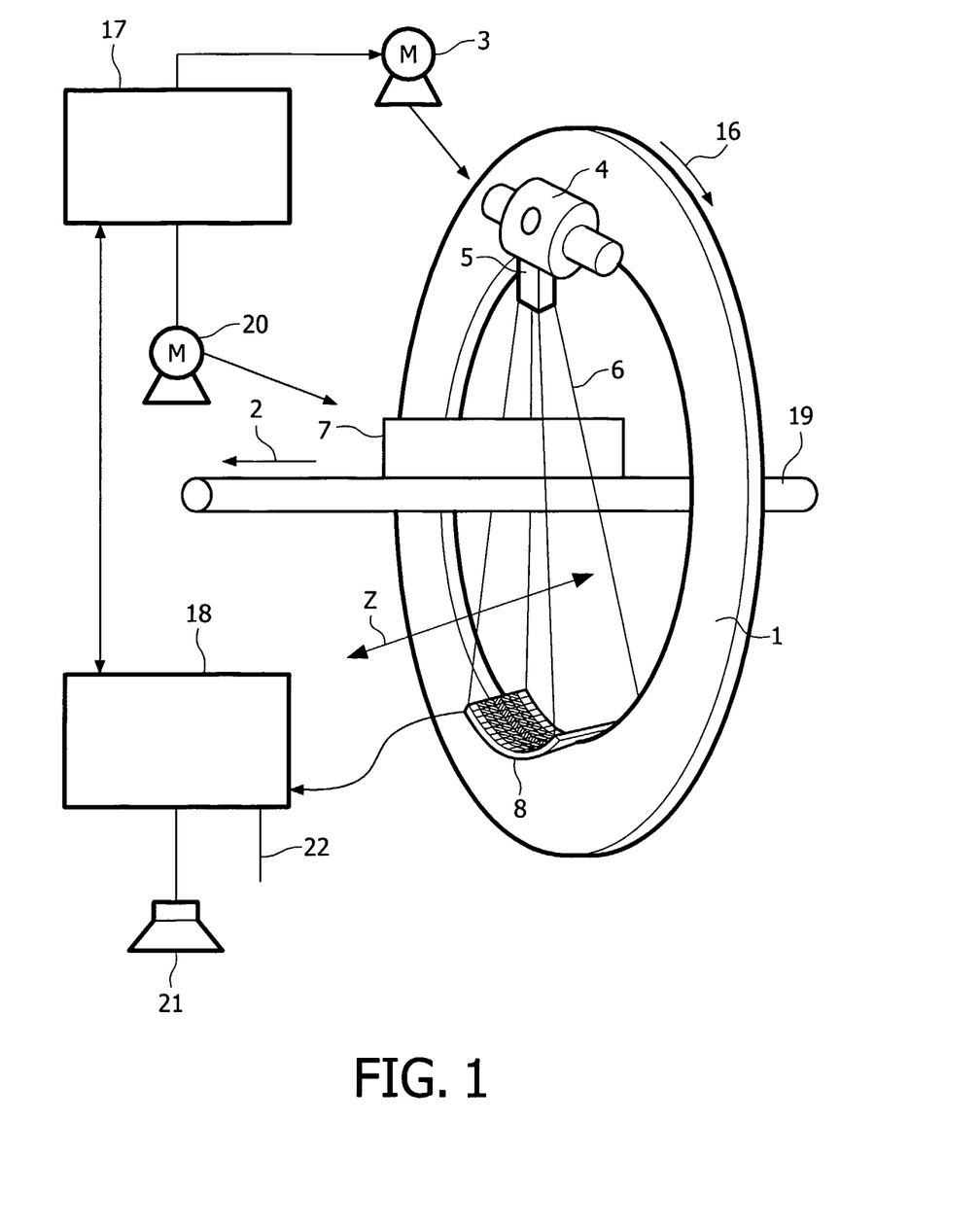
FIG. 1 shows a simplified schematic representation of an embodiment of a computed tomography (CT) scanner according to the present invention.

FIG. 1 shows a simplified schematic representation of an exemplary embodiment of a CT (computed tomography) scanner system according to the present invention. With reference to this exemplary embodiment, the present invention will be described for the application in medical imaging. However, it should be noted that the present invention is not limited to the application in the field of medical imaging, but may be used in applications such as baggage inspection to detect hazardous materials, such as explosives, in items of baggage or other industrial applications, such as material testing.

The scanner depicted in FIG. 1 is a cone beam CT scanner. The CT scanner depicted in FIG. 1 comprises a gantry 1, which is rotatable around a rotational axis 2. The gantry is driven by means of a motor 3. Reference numeral 4 designates a source of radiation such as an x-ray source, which, according to an aspect of the present invention, emits a polychromatic radiation.

Reference numeral 5 designates an aperture system, which forms the radiation beam emitted from the radiation source to a cone shaped radiation beam 6.

The cone beam 6 is directed such that it penetrates an object of interest 7 arranged in the center of the gantry 1, i.e. in an examination region of the CT scanner and impinges onto the detector 8. As may be taken from FIG. 1, the detector 8 is arranged on the gantry 1 opposite the source of radiation 4, such that the surface of the detector 8 is covered by the cone beam 6. The detector 8 depicted in FIG. 1 comprises a plurality of detector elements.

During a scan of the object of interest 7, the source of radiation 4, the aperture system 5 and detector 8 are rotated along gantry 1 in the direction indicated by arrow 16. For rotation of the gantry 1 with the source of radiation 4, the aperture system 5 and the detector 8, the motor 3 is connected to a motor control unit 17, which is connected to a calculation unit 18.

In FIG. 1, the object of interest is disposed on a conveyor belt 19. During the scan of the object of interest 7, while the gantry 1 rotates around the patient 7, the conveyor belt 19 displaces the object of interest 7 along a direction parallel to the rotational axis 2 of the gantry 1. By this, the object of interest 7 is scanned along a helical scan path. The conveyor belt 19 may also be stopped during the scans. Instead of providing a conveyor belt 19, for example, in medical applications, where the object of interest 7 is a patient, a movable table is used. However, it should be noted that in all of the described cases it is also possible to perform a circular scan, where there is no displacement in a direction parallel to the rotational axis 2, but only the rotation of the gantry 1 around the rotational axis 2.

The detector 8 is connected to the calculation unit 18. The calculation unit 18 receives the detection result, i.e. the read-outs from the detector element of the detector 8, and determines a scanning result on the basis of the read-outs. The detector elements of the detector 8 may be adapted to measure the attenuation caused to the cone beam 6 by the object of interest. Furthermore, the calculation unit 18 communicates with the motor control unit 17 in order to coordinate the movement of the gantry 1 with motor 3 and 20 or with the conveyor belt 19.

The calculation unit 18 may be adapted for reconstructing an image from read-outs of the detector 8. The image generated by the calculation unit 18 may be output to a display (not shown in FIG. 1) via an interface 22.

The calculation unit 18 which may be realized by a data processor may also be adapted to perform a processing of a projection data set of an object of interest, wherein the projection data set is acquired by means of the radiation source and the read-outs from the detector elements of the detector 8. According to an aspect of the present invention, the processing of the projection data set may be performed by rebinning the projection data set from a cone-beam geometry to a parallel-beam geometry on the basis of an angular interpolation in view-angle direction. A further rebinning may be performed from the parallel geometry back to the cone-beam geometry, resulting in a data set with a higher radial resolution.

Furthermore, as may be taken from FIG. 1, the calculation unit 18 is connected to a loudspeaker 21 to, for example, automatically output an alarm.

Figure 2:
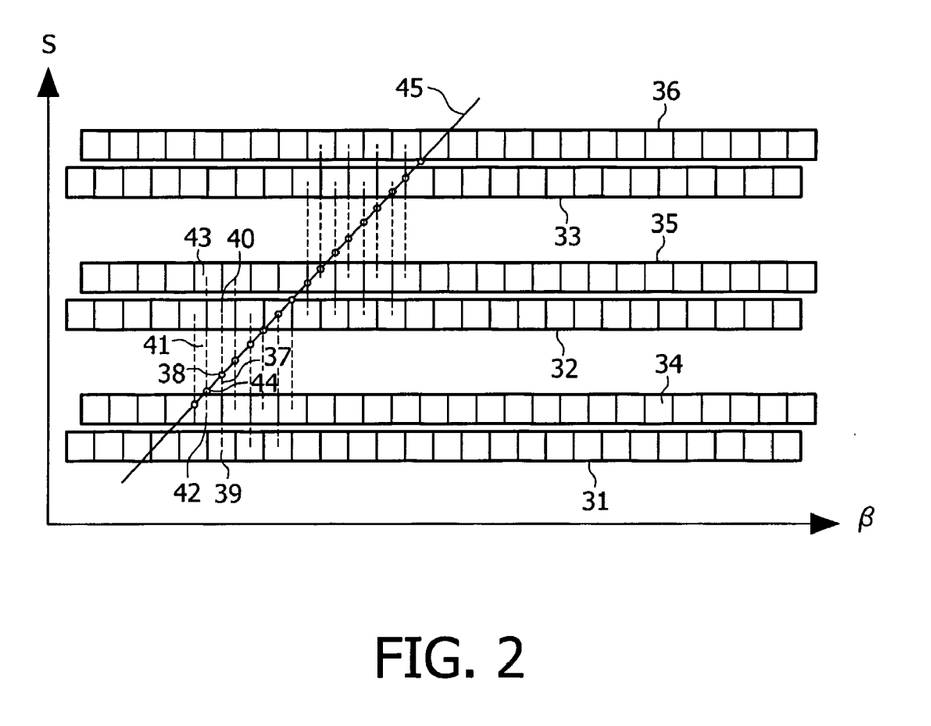
FIG. 2 shows a schematic representation of the first rebinning step, according to an exemplary embodiment of the present invention.

FIG. 2 shows a schematic representation of the geometry of the acquired data and a first rebinning step according to an exemplary embodiment of the present invention. FIG. 2 depicts, how multiple focus acquisition may be used to increase the resolution of the final image. Each line of boxes represents one cone- (fan-) beam projection. In the dual focus acquisition shown here, the focus is manipulated, such that every other projection samples line-integrals at different fan-angle positions β.

Figure 3:
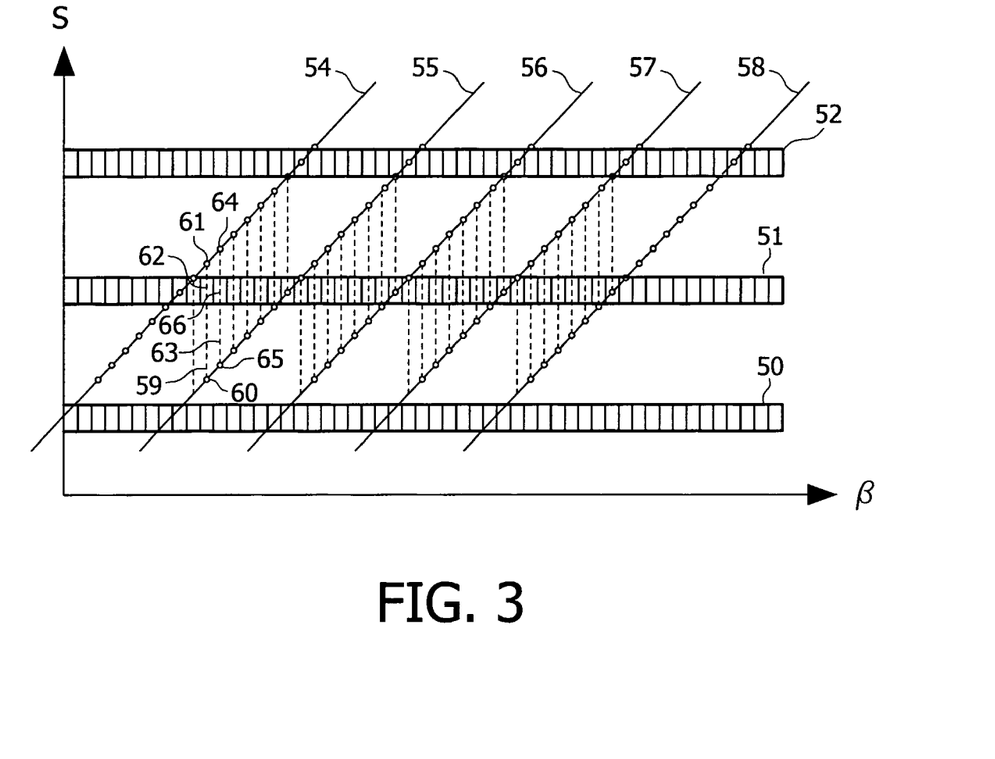
FIG. 3 shows a schematic representation of the second rebinning step, according to an exemplary embodiment of the present invention.

FIGS. 2 and 3 depict the case of a dual focus acquisition, but it should be understood that, according to an exemplary embodiment of the present invention, more than two different foci may be applied during data acquisition.

Like in a standard WEDGE reconstruction, the cone-beam data of the two focus data sets (represented by reference numerals 31, 32, 33 for the first focus data set and 34, 35, 36 for the second focus data set) are parallel resorted or rebinned to parallel projections 45 of twice the radial resolution.

It should be noted that in both FIGS. 2 and 3, only one fan of the cone-beam data is represented.

Only angular interpolation within each data set is applied, as indicated by the dashed lines, for example line 37 and line 41. According to the exact reconstruction algorithm by Katsevich, a first derivative is calculated on these data. More details can be found in the paper by Bontus, Koehler, and Proksa "A quasiexact reconstruction algorithm for helical CT using a 3-Pi acquisition", Medical Physics, vol 30, pp 2493-2502 (2003), which is hereby incorporated by reference.

In order to get data on the parallel view sampled at the circles, for example sampled at circle 38, an angular interpolation is performed in direction of the view-angle s only. The angular interpolation is performed between the data points 39 and 40 in the direction of the view-angle s along dotted line 37. Furthermore, in order to get data sampled at the circle 44, for example, an angular interpolation is performed between data points 42 and 43 along dotted line 41 (again in view-angle direction s). During interpolation, the fan-angle β stays constant. However, it should be noted, that also higher order interpolation may be used, which will require that more data along the line 41 need to be used.

FIG. 3 shows a schematic representation of a second rebinning step, according to an exemplary embodiment of the present invention. In the second rebinning step, the parallel data set 54, 55, 56, 57, 58 is rebinned back to cone-beam geometry data 50, 51, 52. Here, the high resolution of the parallel projections is maintained, resulting in a set of cone-beam projections 50, 51, 52 with twice the resolution of the original cone-beam projections 31, 32, 33, 34, 35, 36 (as depicted in FIG. 2).

As may be seen from FIG. 3, the rebinned data set 50, 51, 52 represents only one position of the focal spot but with twice the resolution of the original cone-beam data. In order to get cone-beam data sampled in the centre of the small rectangles are data points, an interpolation is performed in view-angle direction s only.

For example, a data point 61 from the parallel projection 54 and the data point 60 from the parallel projection 55 are used for forming an interpolation along dotted line 59 (in view-angle direction s, the fan-angle β stays constant) in order to obtain data point 62 in a cone-beam geometry. The neighbouring data point 66, for example, is obtained by interpolating between data point 64 and data point 65, again in the direction of the view-angle s. Therefore, a rebinning is performed from the parallel data to cone-beam geometry, wherein the data in the cone-beam geometry now represents only one position of the focal spot but therefore have a doubled resolution compared to the original cone-beam data.

Figure 4:
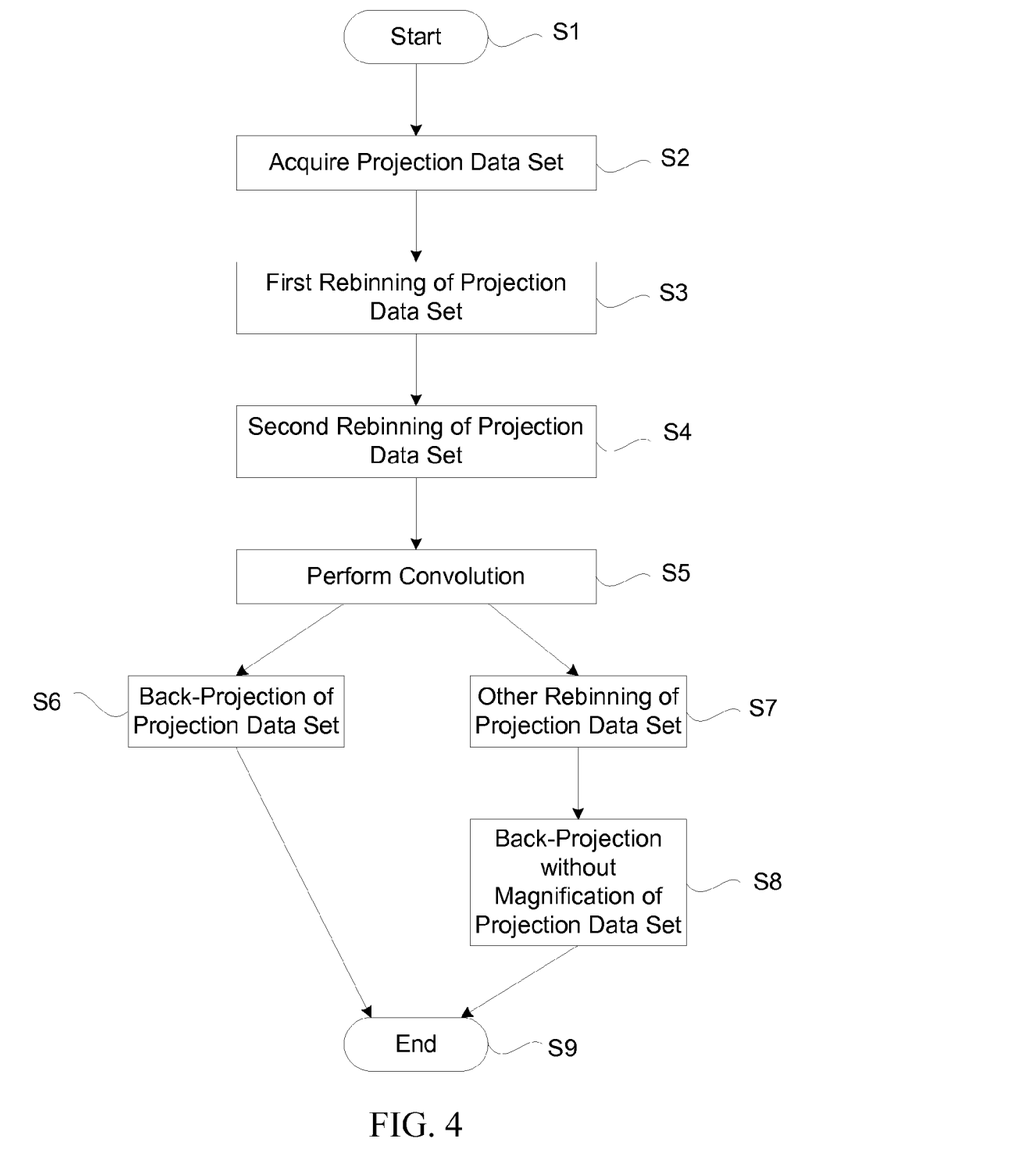
FIG. 4 shows a flow-chart of an exemplary embodiment of a method according to the present invention.

FIG. 4 shows a flow-chart of an exemplary embodiment of a method according to the present invention. After the start at step S1, the projection data set of an object of interest is acquired at two positions of the focal spot in step S2. This may, for example, be done by using a suitable CT scanner or by reading the projection data from a storage. In a subsequent step S3, the projection data set is rebinned from cone-beam geometry to parallel geometry with doubled resolution on the basis of an angular interpolation in view-angle direction. It should be noted at this point, that, in principle, the interpolation may be performed in any other direction than the angular direction.

Then, in step S4, a second rebinning of the projection data is performed, this time from parallel geometry back to cone-beam geometry, resulting in rebinned projection data with only one position of the focal spot but twice the radial resolution of the original cone-beam data. Again, the rebinning is performed on the basis of the angular interpolation in view-angle direction, but may be performed, according to an exemplary embodiment of the present invention, in any other direction than the view-angle direction. Advantageously, the direction of the angular interpolation in the first rebinning step S3 is the same as the direction of the angular interpolation in the second rebinning step S4.

After that, in step S5, a convolution with 1/sin γ is performed, wherein γ is the angle within the Katsevich plane. More details can be found in the paper by Bontus, Koehler, and Proksa "A quasiexact reconstruction algorithm for helical CT using a 3-Pi acquisition", Medical Physics, vol 30, pp 2493-2502 (2003), which is hereby incorporated by reference.

In a next step, the projection data set is now either directly back-projected on the basis of a voxel dependent magnification (step S6) or an other parallel rebinning is applied to the projection data from cone-beam geometry back to parallel-beam geometry (step S7), followed by a simple back-projection without magnification in step S8. The method ends in step S9.

Figure 5:
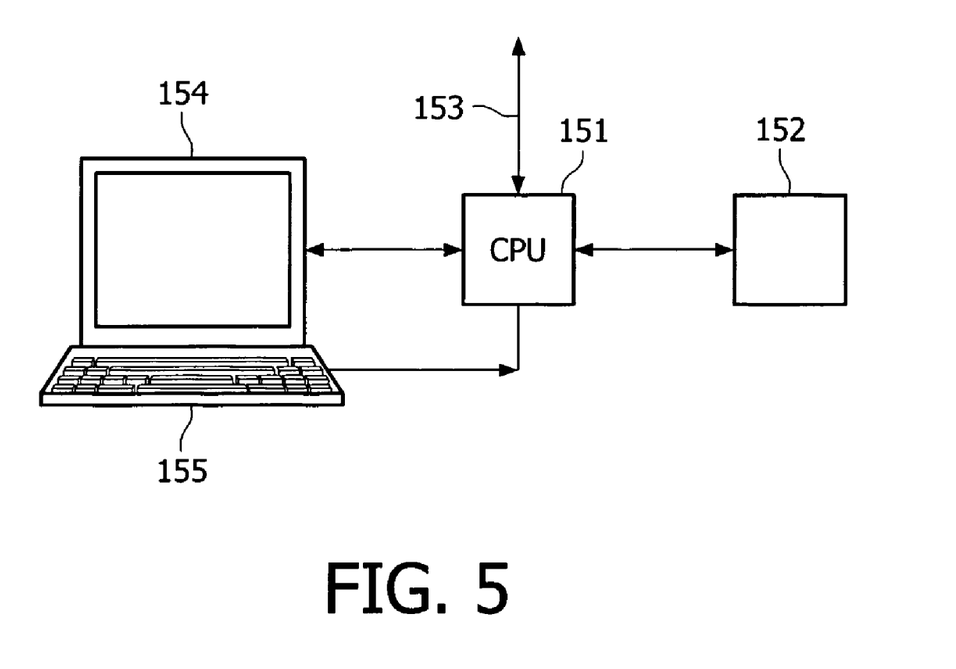
FIG. 5 shows an exemplary embodiment of an image processing device according to the present invention for executing an exemplary embodiment or method in accordance with the present invention.

FIG. 5 depicts an exemplary embodiment of a data processing device according to the present invention for executing an exemplary embodiment of a method in accordance with the present invention. The data processing device depicted in FIG. 5 comprises a central processing unit (CPU) or image processor 151 connected to a memory 152 for storing an image depicting an object of interest, such as a patient. The data processor 151 may be connected to a plurality of input/output network or diagnosis devices, such as an MR device or a CT device. The data processor may furthermore be connected to a display device 154, for example, a computer monitor, for displaying information or an image computed or adapted in the data processor 151. An operator or user may interact with the data processor 151 via a keyboard 155 and/or other output devices, which are not depicted in FIG. 5.

Furthermore, via the buss system 153, it is also possible to connect the image processing and control processor 151 to, for example, a motion monitor, which monitors a motion of the object of interest. In case, for example, a lung of a patient is imaged, the motion sensor may be an exhalation sensor. In case the heart is imaged, the motion sensor may be an electrocardiogram (ECG).

The invention claimed is:

1. A method of processing a projection data set of an object of interest, wherein the projection data is acquired by means of a source of electro-magnetic radiation generating a beam and by means of a radiation detector detecting the beam, the method comprising the step of:
rebinning the projection data set from a first geometry to a second geometry, resulting in a first rebinned projection data set, wherein a second radial resolution of the first rebinned projection data set in the second geometry is higher than a first radial resolution of the projection data set in the first geometry; and
rebinning the first rebinned projection data set from the second geometry to a third geometry, resulting in a second rebinned projection data set.

2. The method of claim 1,
wherein the projection data set in the first geometry comprises a first focus data set and a second focus data set;
wherein the first focus data set is acquired at a first position relative to the detector of a focal spot of the electro-magnetic radiation emitted from the source; and
wherein the second focus data set is acquired at a second position relative to the detector of a focal spot of the electro-magnetic radiation emitted from the source.

3. The method of claim 1,
wherein the second rebinned projection data set comprises a third focus data set; and wherein a third radial resolution of the third focus data set is higher than the first radial resolution of the projection data set in the first geometry.

4. The method of claim 3,
wherein the first geometry is one of a fan-beam geometry and a cone-beam geometry;
wherein the second geometry is a parallel-beam geometry; and
wherein the third geometry is one of a fan-beam geometry and a cone-beam geometry.

5. The method of claim 3,
wherein the rebinning of the projection data set from the first geometry to the second geometry is performed by a first angular interpolation; and
wherein the rebinning of the projection data set from the second geometry to the third geometry is performed by a second angular interpolation.

6. The method of claim 5,
wherein the first and second angular interpolations are performed in a direction of a view-angle with a constant fan-angle.

7. The method of claim 3, further comprising the step of:
reconstructing the object of interest by a filtered back-projection procedure;
wherein the filtered back-projection procedure is one of performed directly by using a voxel dependent magnification and performed after a further rebinning of the second rebinned projection data set from the first geometry to the second geometry without using a magnification.

8. The method of claim 1,
wherein the source of electro-magnetic radiation is a polychromatic x-ray source;
wherein the source moves along a helical path around the object of interest; and
wherein the beam has one of a fan-beam geometry and a cone-beam geometry.

9. A data processing device, comprising:
a memory for storing a data set;
a data processor for processing a projection data set of an object of interest, wherein the projection data is acquired by means of a source of electro-magnetic radiation generating a beam and by means of a radiation detector detecting the beam, wherein the data processor is adapted for performing the following operation:
rebinning the projection data set from a first geometry to a second geometry, resulting in a first rebinned projection data set, wherein a second radial resolution of the first rebinned projection data set in the second geometry is higher than a first radial resolution of the projection data set in the first geometry; and
rebinning the first rebinned projection data set from the second geometry to a third geometry, resulting in a second rebinned projection data set, wherein a third radial resolution is higher than the first radial resolution of the projection data set in the first geometry.

10. Data processing device according to claim 9,
wherein the projection data set in the first geometry comprises a first focus data set and a second focus data set;
wherein the first focus data set is acquired at a first position relative to the detector of a focal spot of the electro-magnetic radiation emitted from the source; and
wherein the second focus data set is acquired at a second position relative to the detector of a focal spot of the electro-magnetic radiation emitted from the source;
wherein the second rebinned projection data set comprises a third focus data set; and wherein a third radial resolution of the third focus data set is higher than the first radial resolution of the projection data set in the first geometry.

11. The data processing device of claim 9, wherein the data processor also processes measurements of an attenuation caused to the cone beam by an object of interest.

12. The data processing device according to claim 9, wherein the data processor performs the rebinning of the projection data set from a cone beam geometry to a parallel beam geometry and the rebinning of the rebinned projection data set from the parallel beam geometry to a cone beam geometry.

13. An image scanner system, comprising:
a memory for storing a data set;
a data processor for processing a projection data set of an object of interest, wherein the projection data is acquired by means of a source of electro-magnetic radiation generating a beam and by means of a radiation detector detecting the beam, wherein the data processor is adapted for performing the following operation:
loading the projection data set;
rebinning the projection data set from a first geometry to a second geometry, resulting in a first rebinned projection data set;
wherein a second radial resolution of the first rebinned projection data set in the second geometry is higher than a first radial resolution of the projection data set in the first geometry; and
rebinning the first rebinned projection data set from the second geometry to a third geometry, resulting in a second rebinned projection data set, wherein a third radial resolution is higher than the first radial resolution of the projection data set in the first geometry.

14. The image scanner system according to claim 13,
wherein the data processor is further adapted for performing the following operation:
rebinning the first rebinned projection data set from the second geometry to a third geometry, resulting in a second rebinned projection data set;
wherein the projection data set in the first geometry comprises a first focus data set and a second focus data set;
wherein the first focus data set is acquired at a first position relative to the detector of a focal spot of the electro-magnetic radiation emitted from the source; and
wherein the second focus data set is acquired at a second position relative to the detector of a focal spot of the electro-magnetic radiation emitted from the source;
wherein the second rebinned projection data set comprises a third focus data set; and
wherein a third radial resolution of the third focus data set is higher than the first radial resolution of the projection data set in the first geometry.

15. The image scanner system according to claim 13, wherein at least one element of the radiation detector is adapted to measure an attenuation caused to the cone beam by an object of interest.

16. The image scanner system according to claim 13, wherein the data processor further adapted to perform the following operation:
reconstructing an image of the radiation detector read-outs.

17. A computer readable storage medium encoded with computer executable instructions for processing a projection data set of an object of interest, the computer executable instructions, when executed by a processor causes the processor to perform the following operation:
loading the projection data set;
rebinning the projection data set from a first geometry to a second geometry, resulting in a first rebinned projection data set, wherein a second radial resolution of the first rebinned projection data set in the second geometry is higher than a first radial resolution of the projection data set in the first geometry; and
rebinning the first rebinned projection data set from the second geometry to a third geometry, resulting in a second rebinned projection data set, wherein a third radial resolution is higher than the first radial resolution of the projection data set in the first geometry.

18. The computer readable storage medium encoded with computer executable instructions according to claim 17,
wherein the projection data set in the first geometry comprises a first focus data set and a second focus data set;
wherein the first focus data set is acquired at a first position relative to the detector of a focal spot of the electro-magnetic radiation emitted from the source; and
wherein the second focus data set is acquired at a second position relative to the detector of a focal spot of the electro-magnetic radiation emitted from the source;
wherein the second rebinned projection data set comprises a third focus data set; and
wherein a third radial resolution of the third focus data set is higher than the first radial resolution of the projection data set in the first geometry.

19. The computer readable storage medium encoded with computer executable instructions according to claim 17, wherein the rebinning of the projection data set from the first geometry to the second geometry is performed by a first angular interpolation and the rebinning of the rebinned projection data set from the second geometry to the third geometry is performed by a second angular interpolation; wherein the first and second angular interpolations are performed in a direction of a view-angle with a constant fan-angle.

20. The computer readable storage medium encoded with computer executable instructions according to claim 17, wherein the computer executable instructions, when executed by a processor causes the processor to perform the further operation of:
reconstructing the object of interest by a filtered back-projection procedure, wherein the filtered back-projection is performed by using a voxel dependent magnification and can also be performed after a further rebinning of the second rebinned projection data set from the first geometry to the second geometry when not using a voxel dependent magnification.

* * * * *